No. 800,322. PATENTED SEPT. 26, 1905.
J. PETRILLO.
EQUALIZING DEVICE FOR SPRING MOTORS.
APPLICATION FILED MAR. 23, 1904.
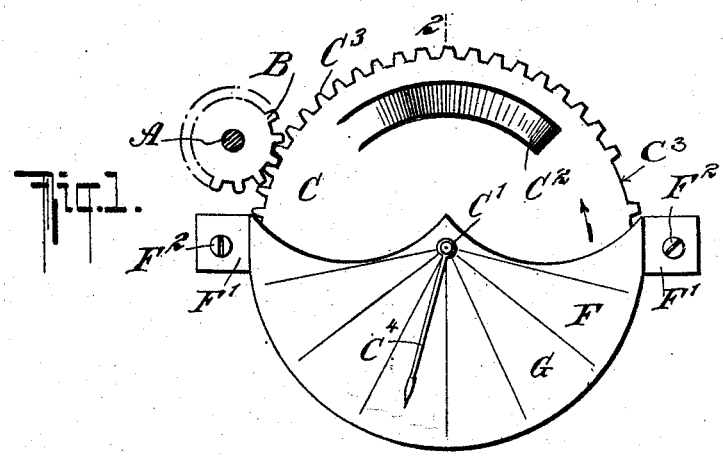
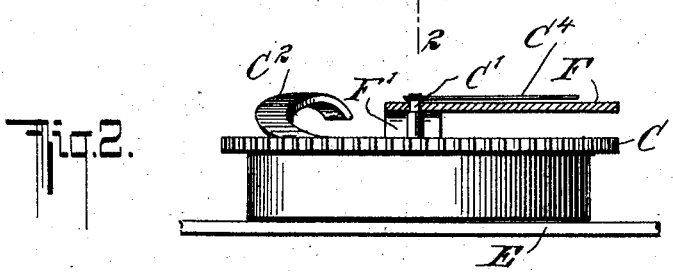
 
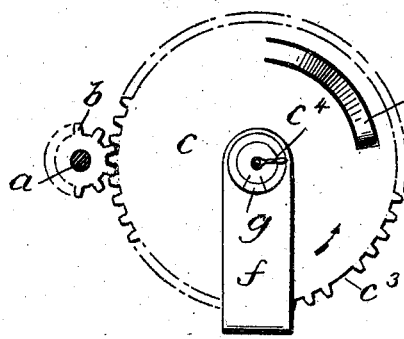 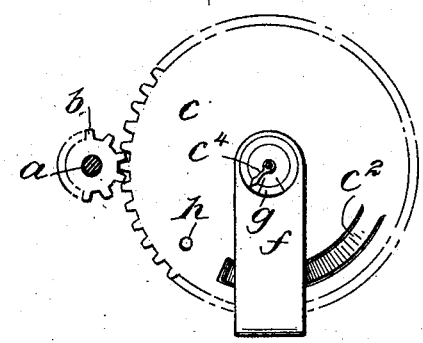
WITNESSES:
Julius H. Lutz
John Lotka
INVENTOR
Joseph Petrillo
BY
Briesen & Knauth
ATTORNEYS

UNITED STATES PATENT OFFICE.

JOSEPH PETRILLO, OF MERIDEN, CONNECTICUT.

EQUALIZING DEVICE FOR SPRING-MOTORS.

No. 800,322. Specification of Letters Patent. Patented Sept. 26, 1905.

Application filed March 23, 1904. Serial No. 199,584.

*To all whom it may concern:*

Be it known that I, JOSEPH PETRILLO, a subject of the King of Italy, and a resident of Meriden, in the county of New Haven and State of Connecticut, have invented certain new and useful Improvements in Equalizing Devices for Spring-Motors, of which the following is a specification.

My invention relates to spring-driven mechanism—such as clocks, watches, and spring-motors—for driving music-boxes, talking-machines, and other devices in which a uniform speed is desirable.

The object of my invention is to provide a simple equalizing device for mechanisms of the above-indicated character.

I will now proceed to describe my invention as illustrated by the accompanying drawings, and will then point out its novel features in the appended claims.

Figure 1 is a plan of one form of my invention. Fig. 2 is a sectional elevation on line 2 2 of Fig. 1; and Figs. 3 and 4 are plans of another form of my invention, showing the same in two different positions.

A indicates a spindle of the mechanism, which spindle carries a pinion B. This pinion is in mesh with a large gear-wheel C, which is connected in any suitable manner with the mainspring or driving-spring, the wheel C being so proportioned that about a complete revolution of it will correspond to the winding or unwinding movement of the mainspring. The pinion B may be the one used for winding the mainspring, said pinion being operated by turning a key or stem in the usual manner, it being understood that the said main or driving spring has its one end attached to the driver and its other end secured to a fixed stud in the usual manner. The gear-wheel C has its spindle C' journaled in a suitable plate E and in a bridge F, which, as shown, covers the gear-wheel in part.

F' indicates brackets for securing the bridge F to the plate E, as by means of screws $F^2$.

The gear-wheel C is provided with an elastic friction device, preferably in the nature of a spring-tongue $C^2$, struck up from the body of said gear-wheel and bent so as to stand at an angle to the plane of such wheel, as shown best in Fig. 2. This tongue is preferably curved about the spindle C' as a center and projects so far away from the gear-wheel C as to engage the bridge F during a portion of the revolution of said wheel. The relative arrangement of the several parts would be such that when the mainspring is fully wound the elastic friction device will be in engagement with the bridge F. As the gear-wheel C rotates in the direction of the arrow in Fig. 1 the friction device will gradually come out of contact with the bridge and will finally clear the same altogether, as shown in said Fig. 1, which represents the position of parts as the wheel approaches its final position. In order to prevent overwinding of the mainspring when the pinion B is used as a winding-pinion, I may leave a blank space $C^3$ at the proper point of the periphery. A hand $C^4$ may be attached to the spindle C' to indicate on a scale or dial G the condition of the mainspring, whether wound fully or partially or unwound. It will be understood that as long as the mainspring is under strong tension the friction device will oppose a considerable resistance to the unwinding of the mainspring. This resistance will gradually lessen as the friction device comes more and more out of contact with the bridge F, and, finally, the resistance of the friction device will be taken off altogether during the second period of the operation. Since the spring-tongue $C^2$ stands at an angle to the wheel C and projects from said wheel to a plane beyond that of the bridge F, it will be obvious that when the tongue reaches the edge of the bridge said tongue will gradually move out from its compressed condition to the free condition shown in Fig. 2. During this gradual relaxation of the spring its frictional resistance to the movement of the wheel C will obviously decrease.

In Figs. 3 and 4 the pinion b, fastened on the spindle a, meshes with the gear-wheel c, having the spring-tongue $c^2$, spindle c', and pointer $c^4$ of substantially the same construction as hereinbefore described. To prevent overwinding, a gap $c^3$ is left at an appropriate point of the periphery of the gear-wheel c, as shown in Fig. 3; or, as an alternative device, a stop-pin h may be provided on said wheel, which pin is adapted to engage one side of the bridge f at the proper time. This same pin h will also by coming against the opposite side of the bridge f act as a stop to prevent the mainspring from running down beyond a certain point, so that the same amount of winding will always be required to bring the spring from its unwound to its wound-up condition. The dial g, on which the pointer $c^4$ indicates, is shown as a complete circle, with two marks indicating the wound and unwound positions of the mainspring, respectively.

Various modifications may be made without departing from the nature of my invention.

What I claim as new, and desire to secure by Letters Patent, is—

1. The combination with a driving-spring, a member adapted to be rotated by the influence of said spring, and a stationary member lying in a parallel plane to the plane of movement of said rotary member and adjacent to only a portion of its periphery, of an elastic friction device carried by said rotary member and adapted to engage the stationary member during part of the revolution of said rotary member and to be disengaged from said stationary member during the remainder of the revolution of said rotary member.

2. The combination with a driving-spring a member adapted to be rotated by the influence of said spring, and a stationary member adjacent to said rotary member, of a friction-spring carried by said rotary member and adapted to engage the stationary member during part of the revolution of said rotary member.

3. The combination with a driving-spring a member adapted to be rotated under the influence of said spring, and a curved resilient tongue extending from said member, of a stationary member adapted for frictional engagement by the said tongue during part of the revolution of the rotary member.

4. The combination with a driving-spring a member adapted to be rotated by the influence of said spring, a stationary member located adjacent to said rotary member, a friction device carried by said rotary member and adapted to engage said stationary member, means for turning the rotary member against the tension of the spring, and a device for arresting the movement of the rotary member against the tension of the spring in a position in which the said friction device engages the said stationary member.

5. The combination with a driving-spring a member adapted to be rotated by the tension of said spring, of a stationary member arranged adjacent to said rotary member, a friction device carried by said rotary member and adapted to engage said stationary member during part of the revolution of the rotary member, and a projection carried by said rotary member and arranged to engage the stationary member at one side or the other, so as to in one case limit the movement of the rotary member under the influence of the spring, and in the other case to limit the movement of said rotary member against the tension of the spring.

In testimony whereof I have signed my name to this specification in the presence of subscribing witnesses.

JOSEPH PETRILLO.

Witnesses:
 THOS. F. DALTON,
 FLORA A. ANDRAS,
 JOHN Q. THAYER.